United States Patent [19]

Gibbs

[11] Patent Number: 4,888,907
[45] Date of Patent: Dec. 26, 1989

[54] CONTROLLED ATTRACTANT-DISCHARGE MECHANISM FOR FISHING LURES

[76] Inventor: Floyd M. Gibbs, 795 S. Balls Ferry Rd., Anderson, Calif. 96007

[21] Appl. No.: 282,022

[22] Filed: Dec. 8, 1988

[51] Int. Cl.$^4$ .............................................. A01K 97/02
[52] U.S. Cl. ................................................. 43/42.06
[58] Field of Search ............................. 43/42.06, 42.36

[56] References Cited

U.S. PATENT DOCUMENTS

| | | | |
|---|---|---|---|
| 2,415,742 | 2/1947 | Hiltabidel et al. | 43/42.06 |
| 2,465,127 | 3/1949 | Stark . | |
| 2,532,879 | 12/1950 | Baker . | |
| 2,594,387 | 4/1952 | Breuer | 43/42.06 |
| 2,599,128 | 6/1952 | Roberts | 43/42.06 |
| 2,968,886 | 1/1961 | Cotroumpas | 43/42.06 |
| 3,105,317 | 10/1963 | Fox | 43/42.06 |
| 3,309,811 | 3/1967 | Wimer | 43/42.06 |
| 4,257,182 | 3/1981 | Thom | 43/42.06 |
| 4,267,658 | 5/1981 | Brown et al. | 43/42.06 |
| 4,463,018 | 7/1984 | Carr . | |
| 4,602,453 | 7/1986 | Polley | 43/42.06 |
| 4,676,020 | 6/1987 | Taylor et al. . | |

Primary Examiner—M. Jordan
Attorney, Agent, or Firm—Christensen, O'Connor, Johnson & Kindness

[57] ABSTRACT

A fishing lure (10) is disclosed for providing controlled discharge of a fish attractant (40). The lure includes a cavity (28) in which an attractand-receiving bladder (34) is positioned. The bladder has an outlet (36) coupled to the body (14) of the lure, with the outlet being controlled by a valve assembly (38). Pressure equalization ports (30) provide fluid communication between the exterior of the lure and the cavity surrounding the bladder. With attractant introduced into the bladder and the lure drawn through water (12), attractant is discharged by the cooperative action of the bladder, the attractant, valve assembly, and environment to enhance the performance of the lure.

9 Claims, 2 Drawing Sheets

CONTROLLED ATTRACTANT-DISCHARGE MECHANISM FOR FISHING LURES

FIELD OF THE INVENTION

This invention relates generally to fishing lures and, more particularly, to fishing lures for use with a dischargeable attractant.

BACKGROUND OF THE INVENTION

Artificial lures have long been used to attract and catch fish. Although the effectiveness of fishing lures traditionally depends upon their appearance and action in the water, some prior art lures include a dischargeable attractant to further improve their performance. More particularly, as such a lure is drawn through water, the attractant is discharged and disperses through the water, increasing the likelihood that nearby fish will strike the lure.

A variety of different attractants have been used to increase the effectiveness of fishing lures in this manner. For example, solid and liquid attractants have been employed, depending upon a variety of factors, including the technique used to discharge the attractant and the conditions under which the lure will be used. The manner in which attractants enhance the desirability of the lure to fish has also varied. For example, scented attractants have been used to stimulate the sense of smell in fish near the lure. Many natural and synthetic products, including fish oils and anise, can be used as scented attractants. Other attractants have also been used to make the lure more visually appealing to nearby fish. For example, colored liquid can be discharged from the fishing lure to attract the attention of nearby fish.

Like the different attractants, a variety of different methods have been employed to couple the attractant to the fishing lure. For example, the exterior of an artificial lure, such as a plastic worm, is sometimes treated with a scented attractant to improve the lure's effectiveness. This treatment is typically performed by dipping a portion or the entirety of the lure in a quantity of a liquid attractant. Alternatively, where the surface of the lure includes a plurality of small cavities, solid attractant can be applied to the lure's exterior and compacted in the cavities, allowing at least some of the scented material to disperse through the water.

As an alternative to the use of attractant on the lure's exterior, various approaches have been developed for discharging attractant from the interior of the lure. For example, hollow lures have been designed for receiving scented solids or scented liquids in a solid matrix. Such lures include a plurality of small openings between the interior and exterior of the lure, allowing water to flow through the lure and disperse at least some of the scented material.

In other embodiments, a liquid attractant is stored in a chamber controllably coupled to a fishing line attached to the lure. The fishing line is connected to a mechanism for controlling the volume of the chamber, an outlet of the chamber, or both. By applying tension to the fishing line, the outlet of the chamber can be opened and its volume reduced, thereby discharging attractant to the surrounding water.

Although each of these prior art arrangements enhances lure performance, they suffer a number of disadvantages. For example, when the exterior of the lure is provided with attractant, the fisherman typically has no control over the rate or manner of attractant dispersion. This is particularly true when solid attractant is applied to the exterior of the lure because the attractant may easily be dislodged by the force of the water against the lure or by a fish biting or "striking" the lure. The use of solid attractant inside a hollow, perforated lure body also provides the fisherman with little control over the attractant's discharge rate. The fisherman can only select different attractants and place varying amounts of attractant inside the lure body.

Similarly, embodiments that employ line tension to control the discharge of liquid attractants are inadequate. More particularly, when a fish strikes the lure, the tension in the line will increase, discharging attractant. The occurrence and duration of this discharge is both beyond the fisherman's control and unnecessary, given that the fish has already struck.

In view of the preceding remarks, it would be desirable to provide a fishing lure that can discharge attractant at a controlled rate not dependent, for example, upon line tension or fish interaction. It would be particularly desirable to provide such a lure allowing the discharge of attractant to be controlled in an adjustable manner by the fisherman.

SUMMARY OF THE INVENTION

In accordance with this invention, a fishing lure is disclosed for controllably discharging an attractant. The lure includes a lure body, an attractant-receiving device, and an attractant discharge control device. The attractant-receiving device is designed to receive and discharge the attractant and is positionable in the lure body. The attractant discharge control device is designed to control the discharge of attractant from the attractant-receiving device, to which it is coupled. In accordance with a particular aspect of this invention, the attractant-receiving device is an expansible and contractible bladder. The lure body includes an outer surface and an opening that places the bladder in fluid communication with the outer surface when the bladder is positioned in the lure body. The valve couples the bladder to the lure body and defines a controllable discharge passage for the attractant from the bladder.

In accordance with another aspect of this invention, the lure includes a lure body, a storage device coupled to the lure body for pressurizing the attractant, and a device for controlling the discharge of pressurized attractant from the storage device. Alternatively, the lure can be described as including a lure body, an attractant-receiving device positionable in the lure body for receiving and discharging attractant, and an attractant discharge control device coupled to the attractant-receiving device for controlling the discharge of attractant from the receiving device in a manner that is nonresponsive to interaction of the lure with a fish.

BRIEF DESCRIPTION OF THE DRAWINGS

The invention will presently be described in greater detail, by way of example, with reference to the accompanying drawings wherein.

DETAILED DESCRIPTION OF THE PREFERRED EMBODIMENT OF THE INVENTION

Figure 1:
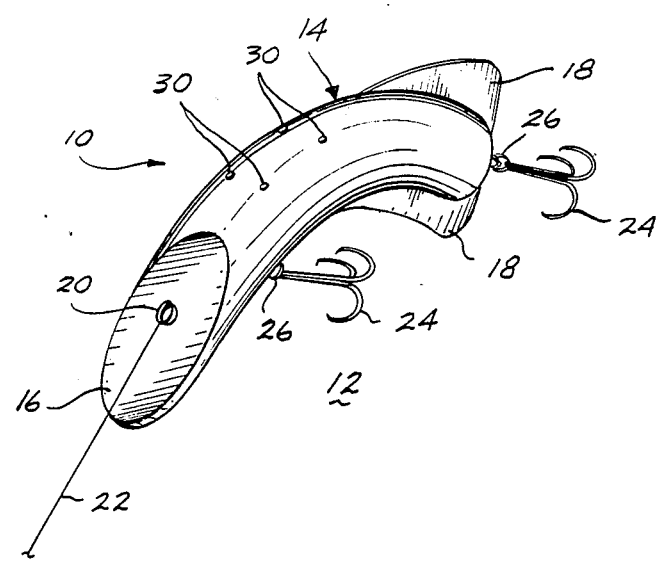
FIG. 1 is a pictorial view of a fishing lure constructed in accordance with the present invention.

Referring now to FIG. 1, a fishing lure 10 constructed in accordance with a preferred embodiment of the invention is illustrated. As will be discussed in greater detail below, lure 10 allows a fisherman to control the discharge of an attractant from lure 10. The discharged attractant then disperses in water 12 and, as a result, fish in the surrounding area will be more likely to strike lure 10, increasing the lure's effectiveness.

Addressing now the various components of lure 10, in the embodiment shown in FIG. 1, lure 10 includes a hollow lure body 14. Lure body 14 is arcuately shaped and includes a contoured lip 16 at its forward end and a pair of fins 18 spaced 180 degrees apart at its aft end. An eyelet 20, secured to lure body 14 at the contoured lip 16, allows lure 10 to be attached to the end of a fishing line 22. As lure 10 is drawn through water 12 by a fishing line 22 during trolling or retrieval, the cooperative action of contoured lip 16 and fins 18 against water 12 imparts a swimming motion or action to the lure 10. A pair of treble hooks 24 are attached to the lure body 14 by two eyelets 26, secured to the lower surface and aft end of body 14.

The size and color of lure 10 may vary depending upon a number of factors including the condition of the water 12 being fished, as well as the species and size of fish sought. In addition, lure 10 may have any one of a wide variety of conventional shapes depending upon, for example, what type of swimming action and retrieval depth are desired. Further, lure body 14 may be made of a variety of materials, with conventional thermoplastics being preferred.

As will be appreciated, the lure body 14 performs several functions of traditional lures. For example, lure body 14 may be brightly colored or styled after some natural bait to visually attract nearby fish. As noted above, lure body 14 also cooperatively interacts with the water 12 to produce a swimming motion that further enhances its appearance. In addition, lure body 14 connects hooks 24 to the fishing line 22.

Figure 2:
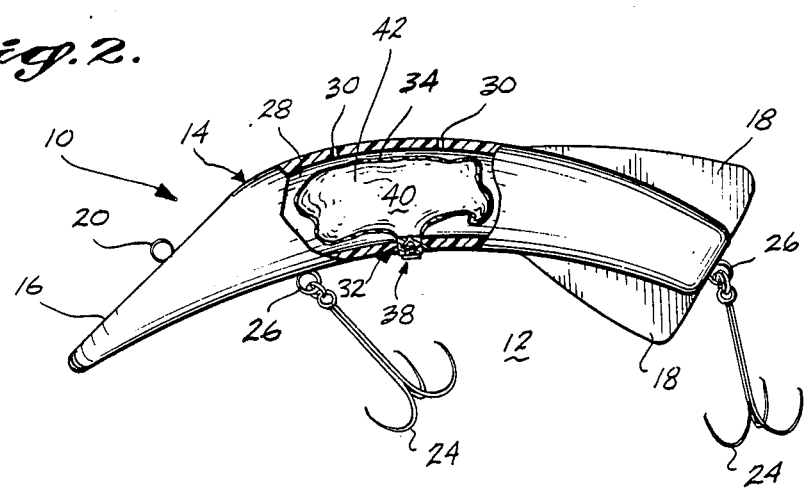
FIG. 2 is a partially broken-away view of the fishing lure of FIG. 1, illustrating an attractant-receiving chamber and control valve included with the lure.

Beyond these conventional features, however, lure body 14 is constructed to allow a fisherman to store attractant in lure 10 and discharge it in a controlled manner. In that regard, as shown in FIG. 2, lure body 14 defines an internal cavity 28, coupled to the exterior of lure body 14 by a plurality of pressure equalization ports 30 and a valve port 32. In the arrangement shown, cavity 28 extends approximately one-third of the length of lure body 14. Four pressure equalization ports 30 are employed in a rectangular pattern on the upper surface of lure body 14. The valve port 32, on the other hand, is located on the lower surface of body 14. In the preferred embodiment, cavity 28 has a volume of at least 1.0 in$^3$ (16.4 cm$^3$), while the pressure equalization ports 30 have circular cross-sectional areas of 0.125 in$^2$ (0.8 cm$^2$) and the valve port 32 has a circular cross-sectional area of 0.125 in$^2$ (0.8 cm$^2$).

Addressing now the manner in which attractant is stored and discharged from lure body 14, reference is again had to FIG. 2. As shown, an attractant-receiving chamber or bladder 34 is located inside the cavity 28 of lure body 14. The outlet 36 of bladder 34 is adhesively secured to a cylindrical boss 37, extending inwardly from the valve port 32 of lure body 14.

Figure 3:
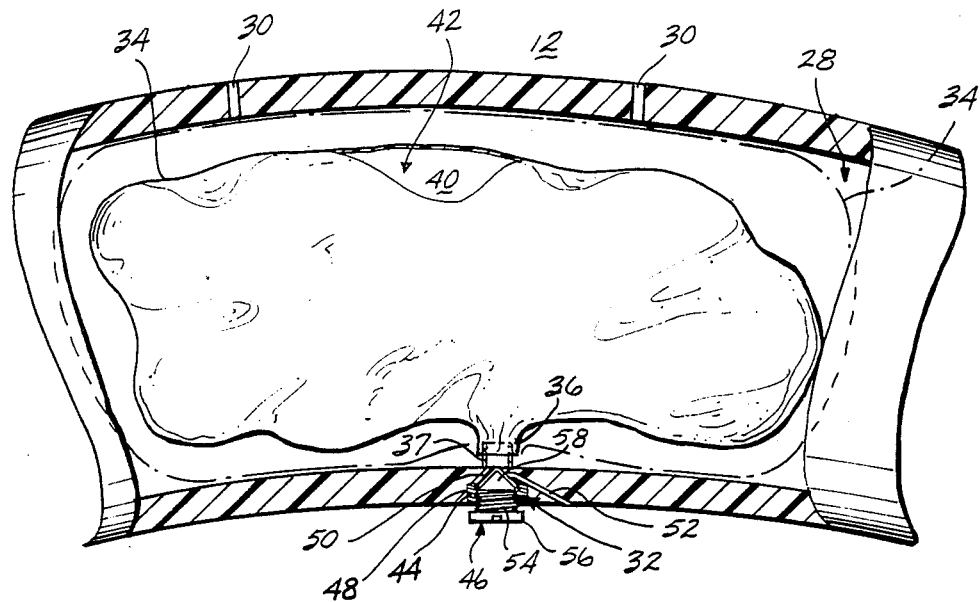
FIG. 3 is a partial cross section of the fishing lure of FIG. 1, further illustrating the attractant-receiving chamber and control valve.

In the preferred embodiment, bladder 34 is made of an elastic material, allowing the bladder 34 to store fluid at a range of pressures. More particularly, as shown in FIG. 3, a liquid attractant 40 is stored in the internal chamber 42 defined by bladder 34. In the solid-line view of bladder 34, bladder 34 is filled to its "natural" volume, in which the elastic material forming bladder 34 is not significantly stretched and the surface area of bladder 34 remains essentially the same as in its unfilled condition.

If additional liquid attractant 40 is then introduced into chamber 42, the elastic bladder material will stretch or expand, distending bladder 34 to the state shown in the broken-line view of FIG. 3. In this condition, the surface area of bladder 34 and volume of chamber 42 have increased, and the elastic nature of the bladder 34 applies a radially inwardly directed force to the liquid attractant 40. As a result, the attractant 40 is maintained at a pressure typically greater than atmospheric pressure.

By controlling the volume of attractant 40 introduced into bladder 34 in this manner, the attractant 40 can be maintained at any one of a range of pressures. In addition to the volume of attractant 40 introduced, the thickness and type of material selected for bladder 34, as well as its natural volume, will affect this pressure. In the preferred arrangement, bladder 34 is made of a rubber compound and has a natural volume of 0.24 in$^3$ (4.0 cm$^3$) and a maximum distended volume of 0.49 in$^3$ (8.0 cm$^3$). This maximum distended volume is controlled by and equal to the volume of lure body cavity 28, thereby making bladder 34 less susceptible to breakage.

In an alternative embodiment, bladder 34 is made of an inelastic material. Rather than being expansible and contractible between natural and distended volumes as described above in connection with the use of an elastic bladder 34, the inelastic bladder 34 can be filled with liquid attractant only until it extends to its natural volume. Although bladder 34 can still be collapsed by removing attractant 40, if more than the natural volume of attractant 40 is added, the resultant stress established in the walls of bladder 34 will likely cause bladder 34 to rupture. As a result, the inelastic bladder 34 typically cannot be used to pressurize the attractant 40 beyond atmospheric pressure.

Referring again to FIG. 2, the outlet 36 of bladder 34 is coupled to a discharge control device or valve assembly 38. As shown in greater detail in the partial sectional view of FIG. 3, one embodiment of valve assembly 38 includes a valve seat 44 and captivated needle valve 46. The roughly cylindrical valve seat 44 is threadably or adhesively secured within a correspondingly cylindrical section 48 of the valve port 32 of lure body 14 and is further internally threaded. A frustoconic section 50 of valve port 32 is located between the cylindrical section 48 of port 32 and the outlet 36 of bladder 34. From the approximate intersection of the frustoconic section 50 and the cylindrical section 48 of valve port 32, a relatively narrow attractant release port 52 extends rearwardly and downwardly at an acute angle, providing fluid communication between the frustoconic section 50 and the exterior of lure body 14.

Addressing now the needle valve 46, a cylindrical section 54 of needle valve 46 is externally threaded for cooperative engagement with the internally threaded valve seat 44. Needle valve 46 also includes a head 56, which is preferably slotted to allow the threaded engagement between needle valve 46 and valve seat 44 to be adjusted by a conventional screwdriver. At the other end of needle valve 46 is a conic projection 58 that extends toward the frustoconic section 50 of the valve port 32 in which the valve seat 44 is positioned. By controlling the relative threaded engagement of needle valve 46 and valve seat 44, the restriction formed between the conic projection 58 of valve 46, the frustoconic section 50 of valve port 32, and attractant release port 52 can be adjusted. As discussed in greater detail below, this adjustment allows the attractant discharge rate to be controlled.

Although not shown in the arrangement of FIG. 3, the cylindrical boss 37 that bladder 34 is attached to can be included as part of a valve seat 44 that threadably engages lure body 14. As a result, the combination of the valve seat 44 and bladder 34 can be removed and replaced, for example, in the event that bladder 34 is damaged.

Figure 4:
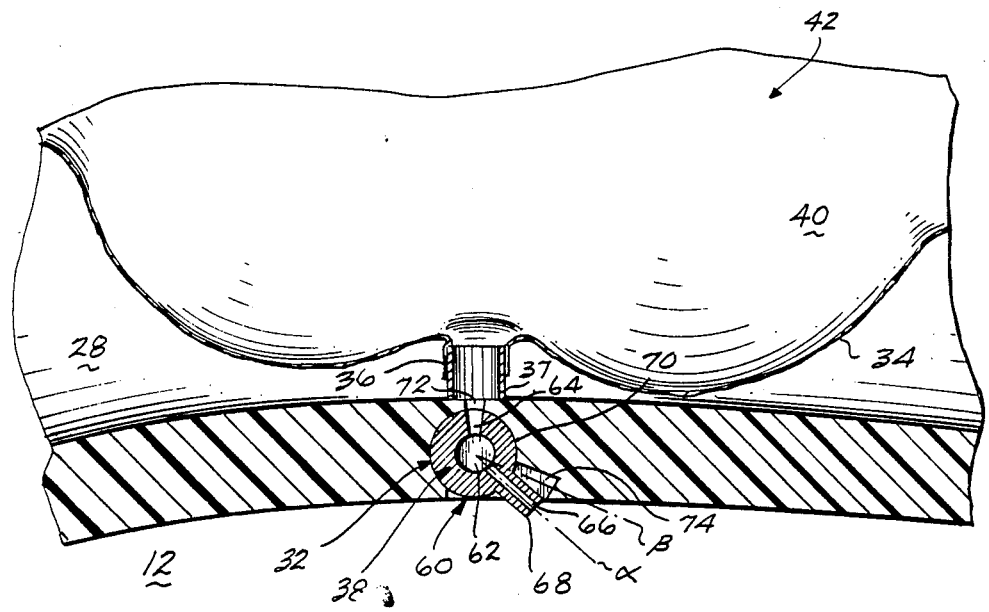
FIG. 4 is a partial cross section corresponding to that of FIG. 3, but illustrating an alternative embodiment of the control valve.

An alternative embodiment of valve assembly 38 is shown in the partial sectional view of FIG. 4. In this embodiment, valve assembly 38 includes a roughly spherical ball valve 60. As will be appreciated from FIG. 4, ball valve 60 is received within a correspondingly roughly spherical valve port 32.

Addressing these elements individually, ball valve 60 is hollow and includes a spherical internal cavity 62. This cavity 62 is coupled to the exterior of ball valve 60 by a pair of ports 64 and 66. Port 64 is frustoconic, having a circular cross section that is greatest at the exterior of ball valve 60. Port 64 is designed to place cavity 62 in fluid communication with bladder 34. Port 66 of ball valve 60 has a uniform circular cross section and is extended beyond the spherical surface of ball valve 60 by a boss 68. Port 66 is included to place cavity 62 in fluid communication with the exterior of lure body 14. The axes of ports 64 and 66 are preferably aligned at an angle between 90 and 180 degrees.

With respect to the valve port 32, ball valve 60 is rotatably secured within a section 70 of the valve port 32 that is roughly shaped like a section of a sphere. Section 70 is coupled to the boss 37 by a frustoconic section 72. A partial, cylindrical recess 74 is provided in the lower, aft region of section 70, with the axis of cylindrical recess 74 being angled downwardly and rearwardly. Recess 74 is included to receive boss 68 when ball valve 60 is in a closed position.

As noted previously, the bladder 34 within lure 10 is designed to receive and discharge an attractant 40. Although various different types of attractants are contemplated for use, in the preferred embodiment, attractant 40 is a liquid whose viscosity does not unduly restrict flow through valve assembly 38 and which disperses relatively quickly in water. The attractant 40 also preferably has a density greater than fresh water, i.e., 1.0g/cm$^3$. Attractant 40 may be scented or colored to alternatively enhance the scent and visibility of the lure 10 upon discharge. Similarly, the attractant 40 may include reflective particles to attract the attention of fish.

Discussing now the operation of a lure 10 constructed in the manner outlined above, bladder 34 is first filled with attractant 40. In the preferred arrangement, attractant 40 is stored in a dispenser such as a squeeze bottle having a tapered discharge spout for insertion into the attractant release port 52. More particularly, when the valve assembly 38 shown in FIG. 3 is employed, needle valve 46 is loosened from valve seat 44 and the spout of the dispenser inserted into the attractant release port 52. The bottle is then squeezed to dispense the desired volume of attractant 40 into bladder 34. With the bladder 34 filled in this manner, needle valve 46 is tightened in valve seat 44 and inserted sufficiently to block the outlet 36 of bladder 34.

In the arrangement of FIG. 4, bladder 34 is filled in the following manner. The boss 68 of ball valve 60 is first rotated to the angle a shown in FIG. 4. In this position, ball valve 60 is "open". The spout of the squeeze bottle is then inserted into the port 66 defined by boss 68. When the bottle is squeezed, attractant 40 is dispensed through port 64, cavity 62, and port 66 of ball valve 60, entering and filling the attractant-receiving bladder 34. The boss 68 of ball valve 60 is then rotated to the cylindrical recess 74, angle $\beta$, shown in FIG. 4 to close valve 60 and prevent the escape of attractant 40.

Regardless of the method used to fill bladder 34, the fisherman must decide how much attractant 40 to dispense into bladder 34. In that regard, as noted previously, when an inextensible bladder 34 is used, the fisherman can dispense any volume of attractant 40 into bladder 34 up to the natural volume of bladder 34. The resultant volume of attractant 40 stored within bladder 34 affects the time required to discharge the attractant 40 but not the rate at which the attractant 40 is discharged.

When bladder 34 is extensible, however, as discussed above, attractant 40 can be added to expand bladder 34 beyond its natural volume and cause the bladder 34 to apply radially inwardly directed force to the attractant 40, increasing its pressure. By increasing the pressure of attractant 40 above that of the atmosphere, the discharge rate of the bladder 34 will also be increased.

With the bladder 34 filled, the valve assembly 38 is now adjusted to provide the desired control over the discharge of attractant 40. In the arrangement shown in FIG. 3, given a particular combination of, for example, the attractant 40 selected and bladder pressure, the needle valve 46 is rotated until a desired restriction between the needle valve 46 and the frustoconic section 50 of valve port 32 is formed. Similarly, in the arrangment shown in FIG. 4, the ball valve 60 can be rotated between the open and closed positions, designated $\alpha$ and $\beta$, to restrict the passage defined by port 64 and frustoconic section 72. In either case, the rate at which attractant 40 is discharged will be directly proportional to the cross-sectional area of the restriction.

With bladder 34 filled and the valve assembly 38 properly adjusted, the lure 10 is now ready for use in fishing. The lure 10 is attached to a fishing line and introduced into the water 12. As will be appreciated, the water 12 will be at a higher pressure than the air in the cavity 28 surrounding bladder 34. As a result, water will enter cavity 28 through the pressure equalization ports 30, forcing the lower pressure air from cavity 28. With water of substantially the same pressure present around bladder 34 and at its outlet 36, the water pressure is in equilibrium and does not significantly affect the discharge of attractant 40.

If the presure equalization ports 30 were not included, however, the water pressure surrounding lure 10 would be higher than the air pressure within cavity 28 and around bladder 34. To equalize that pressure, water 12 would likely intrude through the valve assembly 38, increasing the volume of fluid contained within bladder 34 and compressing the air within cavity 28. As will be appreciated, the discharge of attractant 40 from bladder 34 would be significantly impeded.

Returning now to a discussion of the forces cooperating to effect discharge of attractant 40, as noted above, the pressure of the water 12 has relatively little influence on the discharge rate. When an extensible bladder 34 is employed and extended by filling bladder 34 beyond its natural volume, however, the bladder 34 itself further pressurizes attractant 40 to affect its discharge. The bladder 34 thus discharges attractant 40 until the bladder 34 contracts to its natural volume. At that point, the operation of bladder 34 is substantially the same as an inelastic design in which discharge is accomplished by a number of additional factors.

For example, when the density of attractant 40 is greater than that of the water 12, the force of gravity will cause attractant 40 to drip out through valve assembly 38. In addition, water turbulence in cavity 28 resulting from the ingress of water through pressure equalization ports 30 may apply some forces to the exterior of bladder 34 causing attractant 40 to be discharged. Further, particularly in connection with the use of scented attractants, some of the scent will disperse through water 12 even with limited fluid transfer through valve 38.

By controlling the construction of bladder 34 and the type of attractant 40 selected, as well as the volume of attractant 40 introduced into bladder 34 and the setting of valve assembly 38, a wide variety of discharge rates can be achieved. Each of these factors is controlled, based upon the fisherman's experience, to provide the most successful discharge rate. The fishing lure 10 is then used until the fisherman perceives that attractant 40 is depleted. This can be determined by, for example, visually monitoring the drip rate of attractant 40 from outlet 36 when the lure 10 is removed from the water, or by the appearance of bladder 34 in arrangements employing transparent or translucent lure bodies 14. When bladder 34 is empty of depleted, additional attractant 40 is introduced into bladder 34.

Those skilled in the art will recognize that the embodiments of the invention disclosed herein are exemplary in nature and that various changes can be made therein without departing from the scope and the spirit of the invention. In this regard, and as was previously mentioned, the invention is readily embodied with a variety of bladders, valve assemblies, and attractants. Further, it will be recognized that the interrelationship of these components and their relationship to the lure can be varied as desired. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. A fishing lure, for controllably discharging an attractant, comprising:
    a lure body;
    a bladder, positionable in said lure body, for receiving and discharging the attractant; and
    a valve, coupled to said bladder, for controlling the discharge of the attractant from said bladder, said lure body including an outer surface and an opening that maintains said bladder in fluid communication with said outer surface when said bladder is positioned in said lure body.

2. The lure of claim 1, wherein said valve couples said bladder to said lure body and defines a controllable discharge passage for the attractant from said bladder.

3. The lure of claim 2, wherein said valve is selectively adjustable to define discharge passages of different cross-sectional area.

4. The lure of claim 3, wherein the attractant is a scented liquid.

5. The lure of claim 3, wherein the attractant is a liquid whose density is greater than 1.0 g/cm$^3$.

6. A fishing lure, for discharging a liquid attractant, comprising:
    a lure body;
    an elastically expansible and contractible storage means, coupleable to the lure body, for storing an initially pressurized liquid attractant; and
    means for controlling the discharge of liquid attractant under pressure from said storage means.

7. A fishing lure, for controllably discharging an attractant, comprising:
    a lure body;
    a bladder, positionable in said lure body, for receiving and discharging the attractant; and
    attractant-discharging control means, coupled to said bladder, for controlling the discharge of the attractant from said bladder in a manner that is nonresponsive to the strike of a fish.

8. A method for preparing a fishing lure for use comprising the steps of:
    introducing a liquid attractant into a storage device, included in the lure, under pressure; and
    adjusting a control valve connected to the storage device to control the rate at which attractant is discharged from said lure during use.

9. A fishing lure, for controllably discharging an attractant, comprising:
    a lure body;
    an elastically expansible and contractible bladder, positionable in said lure body, for receiving and discharging the attractant; and
    attractant discharge control means, coupled to said bladder, for controlling the discharge of the attractant from said bladder.

* * * * *